United States Patent
Heubner

(10) Patent No.: US 11,242,869 B2
(45) Date of Patent: Feb. 8, 2022

(54) PUMP UNIT FOR PROVIDING A HYDRAULIC PRESSURE FOR ACTUATING AN ACTUATOR IN THE DRIVE TRAIN OF A MOTOR VEHICLE

(71) Applicant: FTE automotive GmbH, Ebern (DE)

(72) Inventor: Wilhelm Heubner, Ebern (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 16/564,280

(22) Filed: Sep. 9, 2019

(65) Prior Publication Data
US 2020/0080573 A1  Mar. 12, 2020

(30) Foreign Application Priority Data
Sep. 12, 2018 (DE) .................. 10 2018 122 305.6

(51) Int. Cl.
| | |
|---|---|
| *F15B 1/26* | (2006.01) |
| *F04B 53/20* | (2006.01) |
| *F16K 21/00* | (2006.01) |
| *F16H 57/04* | (2010.01) |
| *F16K 31/08* | (2006.01) |
| *F16H 61/00* | (2006.01) |

(52) U.S. Cl.
CPC .............. *F15B 1/26* (2013.01); *F04B 53/20* (2013.01); *F16H 57/0404* (2013.01); *F16K 21/00* (2013.01); *F16K 31/08* (2013.01); *F16H 2061/0037* (2013.01)

(58) Field of Classification Search
CPC ....... F15B 1/26; F16K 27/029; F16H 61/0009
See application file for complete search history.

(56) References Cited

U.S. PATENT DOCUMENTS

| | | |
|---|---|---|
| 4,639,704 A | 1/1987 | Shand et al. |
| 2012/0312655 A1 | 12/2012 | Heubner |
| 2013/0164163 A1 | 6/2013 | Ohnishi et al. |
| 2014/0169997 A1* | 6/2014 | Ibatici ................ F15B 1/26 417/410.4 |
| 2015/0179326 A1* | 6/2015 | Shimizu ............. H01F 7/1607 335/260 |
| 2015/0279538 A1* | 10/2015 | Toda ................... H01F 7/081 475/31 |

FOREIGN PATENT DOCUMENTS

| | | |
|---|---|---|
| DE | 10 2006 030 141 A1 | 1/2008 |
| EP | 2 532 914 A1 | 12/2012 |

OTHER PUBLICATIONS

German Search Report dated Apr. 30, 2019 in German Application No. 10 2018 122 305.6 filed on Sep. 12, 2018 (with English Translation of Categories of Cited Documents & Written Opinion).
Extended European Search Report dated Jan. 20, 2020, in Patent Application No. 19195232.4, citing documents AA-AC and AO therein, 7 pages.

* cited by examiner

*Primary Examiner* — Reinaldo Sanchez-Medina
*Assistant Examiner* — Nicole Gardner
(74) *Attorney, Agent, or Firm* — Oblon, McClelland, Maier & Neustadt, L.L.P.

(57) ABSTRACT

A pump unit provides a hydraulic pressure for actuating an actuator in the drive train of a motor vehicle, in particular a clutch actuator or gearbox actuator. The pump unit includes a pump, a storage container for hydraulic fluid, and at least one solenoid valve. The solenoid valve is arranged within the storage container such that it is surrounded by hydraulic fluid.

9 Claims, 13 Drawing Sheets

- - - - - ▶ Flow, no pressure
— - — ▶ Flow, pressure
········▶ Electrical Current

- - - - -▶ Flow, no pressure
— - —▶ Flow, pressure
· · · · · ·▶ Electrical Current

PUMP UNIT FOR PROVIDING A HYDRAULIC PRESSURE FOR ACTUATING AN ACTUATOR IN THE DRIVE TRAIN OF A MOTOR VEHICLE

BACKGROUND

The invention relates to a pump unit for providing a hydraulic pressure for actuating an actuator in the drive train of a motor vehicle, in particular a clutch actuator or gearbox actuator, with a pump, a storage container for hydraulic fluid and at least one solenoid valve.

The pump unit serves to provide a hydraulic pressure which is controlled or regulated by activation of the solenoid valve. The hydraulic pressure can be used to switch a clutch between an open and a closed position or, in the case of a gearbox actuator, to switch a certain gear stage.

It is the object of the invention to improve a pump unit of this type.

BRIEF SUMMARY

To achieve this object, in the case of a pump unit of the type mentioned at the beginning, according to the invention it is provided that the solenoid valve is arranged within the storage container and therefore it is surrounded by hydraulic fluid. By this means, the solenoid valve is very readily protected against environmental influences and corrosion. In addition, the solenoid valve can be cooled by the hydraulic fluid. In the event of a cold start, the solenoid valve can be used to heat the hydraulic fluid. The positioning of the solenoid valve within the storage container leads to extremely short paths between valve and storage container, thus resulting in good reaction times and a low dynamic pressure loss.

The solenoid valve preferably has a coil which is surrounded by a housing, wherein a preferably annular free space which is filled with hydraulic fluid is provided between the coil and the housing. This results in an even better transfer of heat between the solenoid valve and the hydraulic fluid if the solenoid valve is not only washed around by hydraulic fluid on the outside, but the coil directly also is too.

According to one refinement of the invention, it is provided that the solenoid valve has a return outlet which leads within the housing. This ensures that the free space is not a "dead volume", but is always washed through by hydraulic fluid.

According to one refinement of the invention, the solenoid valve has an armature, wherein there is a bearing gap between the armature and the coil surrounding the latter, the bearing gap extending over at least 50% of the axial length of the armature, wherein the bearing gap is filled with hydraulic fluid. By the armature also being washed around by hydraulic fluid, foreseeable damping properties arise at all times.

The solenoid valve is preferably a proportional valve, and therefore the hydraulic pressure at the pressure outlet of the pump unit can be controlled very precisely.

The solenoid valve is preferably attached directly to a pump housing of the pump, thus producing a very compact design with short paths.

BRIEF DESCRIPTION OF THE DRAWINGS

The invention will be described below with reference to an embodiment which is illustrated in the attached drawings. In the latter:

FIG. 14 shows the solenoid valve from FIG. 13, wherein the fluid flows during operation have been drawn in;

DETAILED DESCRIPTION

Figure 1:
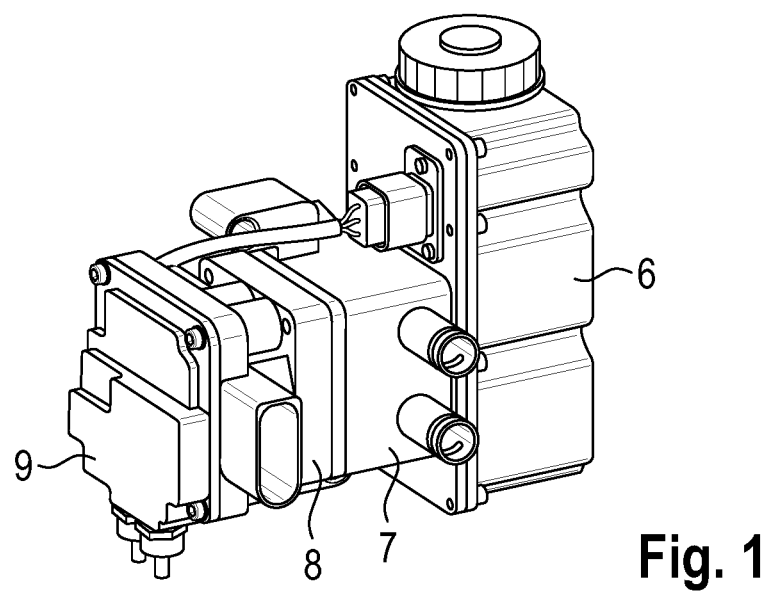
FIG. 1 shows a pump unit in a perspective view.

The figures illustrate a pump unit which serves to provide a hydraulic pressure (and also a hydraulic fluid flow) which can be converted by an actuator in the drive train of a motor vehicle into an actuating stroke. The actuating stroke can be used to close or open a clutch, for example, or can be used to switch a gear stage of a gearbox or to bring same into the neutral position.

As essential components (see in particular FIGS. 1 and 2), the pump unit has a drive motor 1, a pump 2, an electronic control system 3, two solenoid valves 4, two pressure sensors 5, which are accommodated in a common housing, and a storage container 6.

The central component of the pump unit is a pump housing 7 on which the solenoid valves 4 are mounted and on which the storage container 6 is also mounted. The pressure sensors 5 are also mounted on the pump housing 7.

On the side opposite the storage container 6, an electronic housing 8 is mounted on the pump housing 7, said electronic housing firstly accommodating the electronic control system 3 and secondly containing the stator of the electric motor 1. A cover 9 is mounted on the electronic housing 8, the cover closing the electronic control system 3 and serving to dissipate the heat lost from the electronic control system 3 to the environment.

Figure 4:
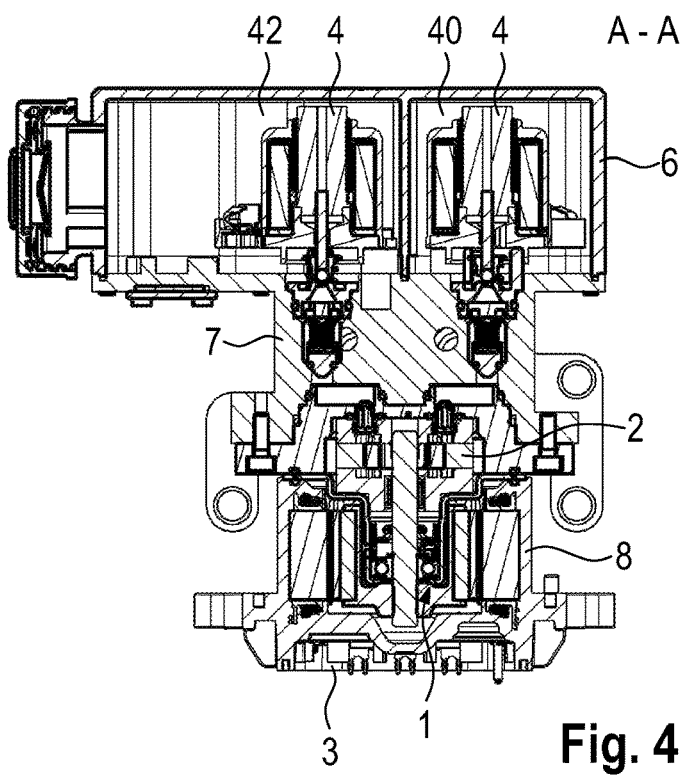
FIG. 4 shows the pump unit from FIG. 3 in a first sectional view.
Figure 5:
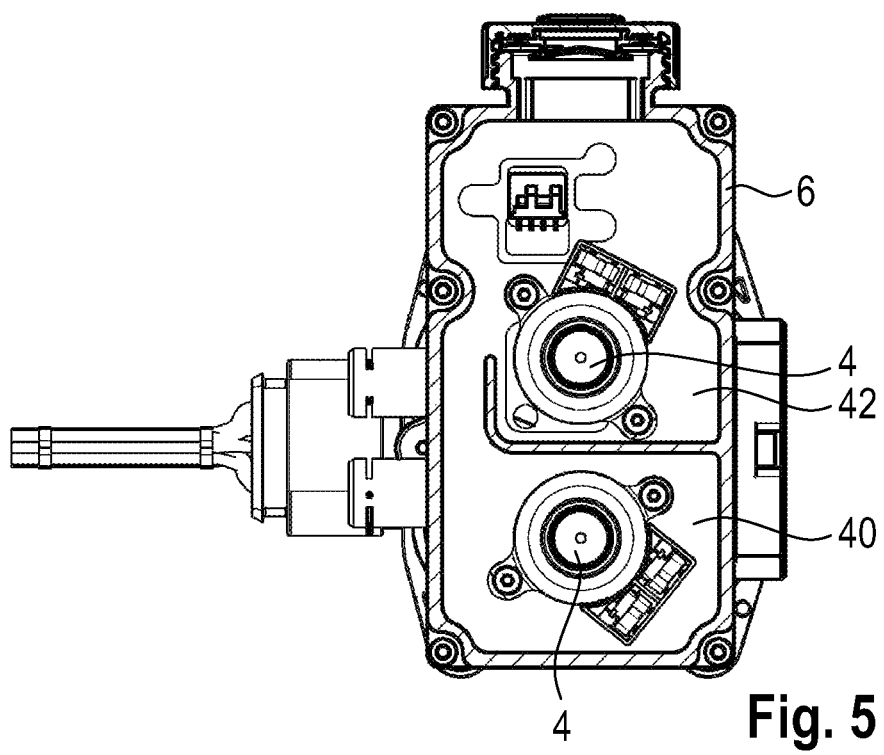
FIG. 5 shows the pump unit from FIG. 3 in a second sectional view.

As can be seen in FIGS. 4 and 5, the solenoid valves 2 are arranged within the storage container 6.

The electric motor 1 is a brushless electric motor with which the pump 2 is driven.

Figure 21:
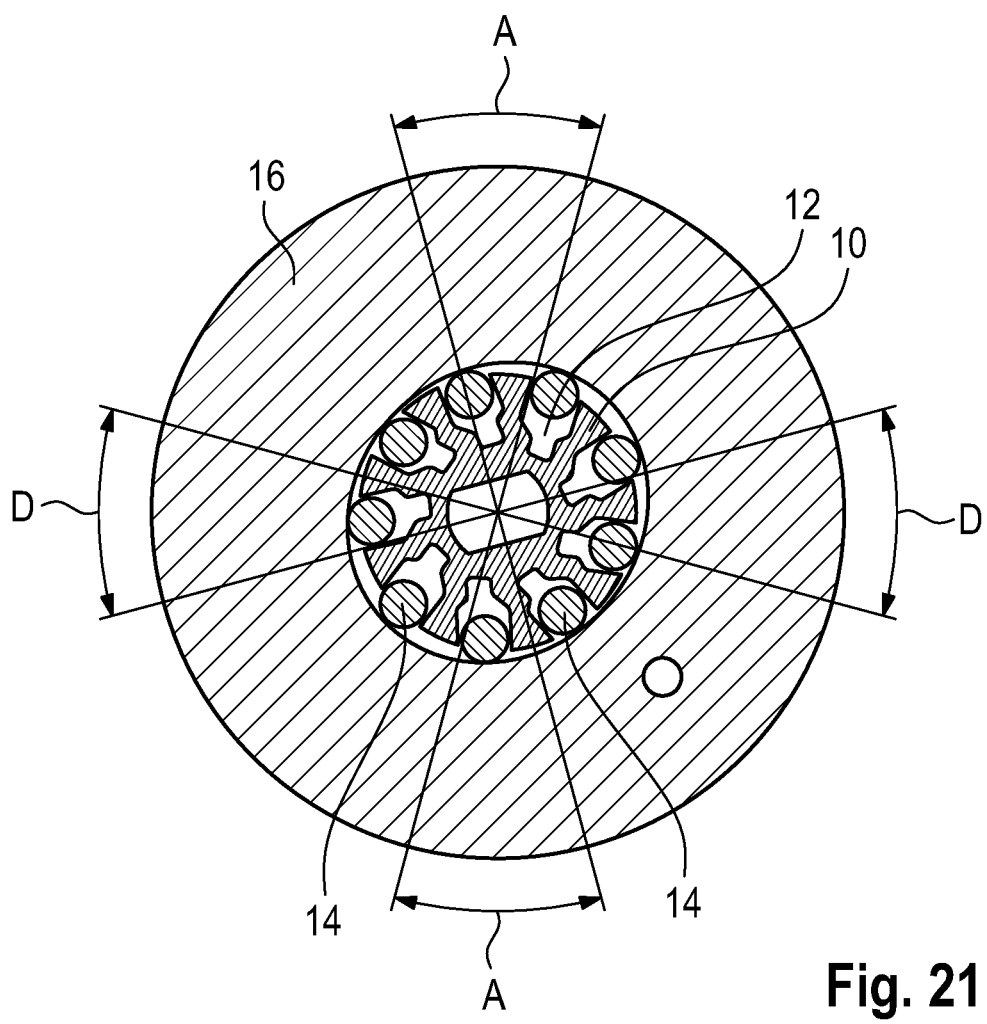
FIG. 21 shows a cross section through the pump of the pump unit.

The pump 2 is a rotary vane pump (see FIG. 21) which has a rotor 10 with a plurality of chambers 12, in each of which a rotary vane element 14 is arranged. The rotary vane elements 14 are cylindrical rollers. The pump is therefore a roller vane pump.

The cylindrical rollers roll on the inner contour of a stator 16 which defines a volume which is variable in the circumferential direction. Accordingly, during rotation of the rotor 10 by 360°, each rotary vane element passes twice through a sequence of intake region A and pressure region D. Accordingly, the pump has two suction connections and two pressure outlets.

Owing to the two independent pressure outlets D of the pump 2, the pump unit likewise has two pressure outlets 20 which are independent of each other.

The pump is constructed symmetrically by all the components which will be explained below being present for each pressure outlet. Thus when, for example, "the" solenoid valve is described below, this applies to the two solenoid valves since one is present for each pressure outlet.

Figure 6:
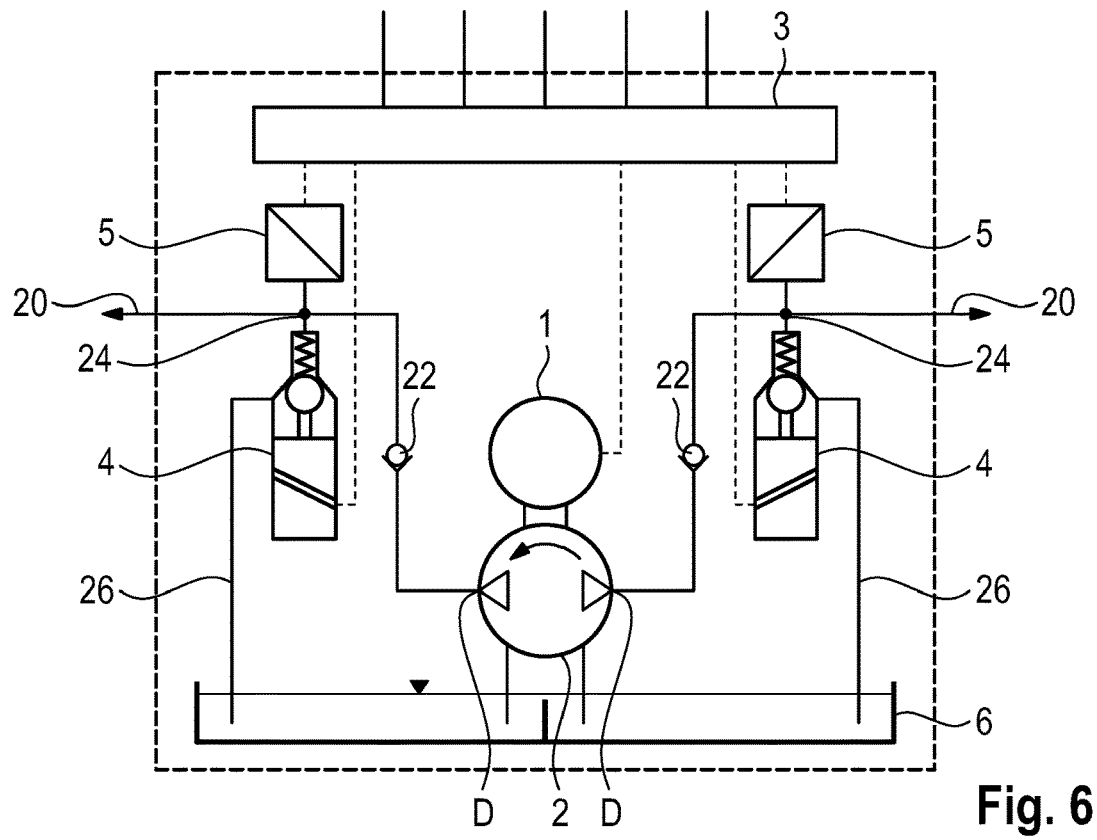
FIG. 6 shows a hydraulic circuit diagram of the pump unit.

The basic operation of the pump unit will now be explained with reference to FIGS. 6 to 8.

The pump unit has two pressure outlets 20 via which the hydraulic pressure is provided which is produced by the pump unit for actuating the actuator.

A nonreturn valve 22 is arranged downstream of each pressure outlet D of the pump 2. The nonreturn valves 22 have a valve seat made of rubber.

The inlet 24 of the solenoid valve 4 is located downstream of the outlet of the nonreturn valve 22. Depending on the desired pressure and the actual pressure measured at the pressure sensor 5, each of the solenoid valves 4 is activated in such a manner that the desired hydraulic pressure is present at the pressure outlet 20 of the pump unit. Excess hydraulic fluid is conducted back directly into the storage container 6 by a return line 26.

The solenoid valves 4 are designed as proportional valves and, as valve element, have a ball which, together with the valve seat, ensures that the solenoid valve 4 is free from leakage in the closed state.

Figure 7:
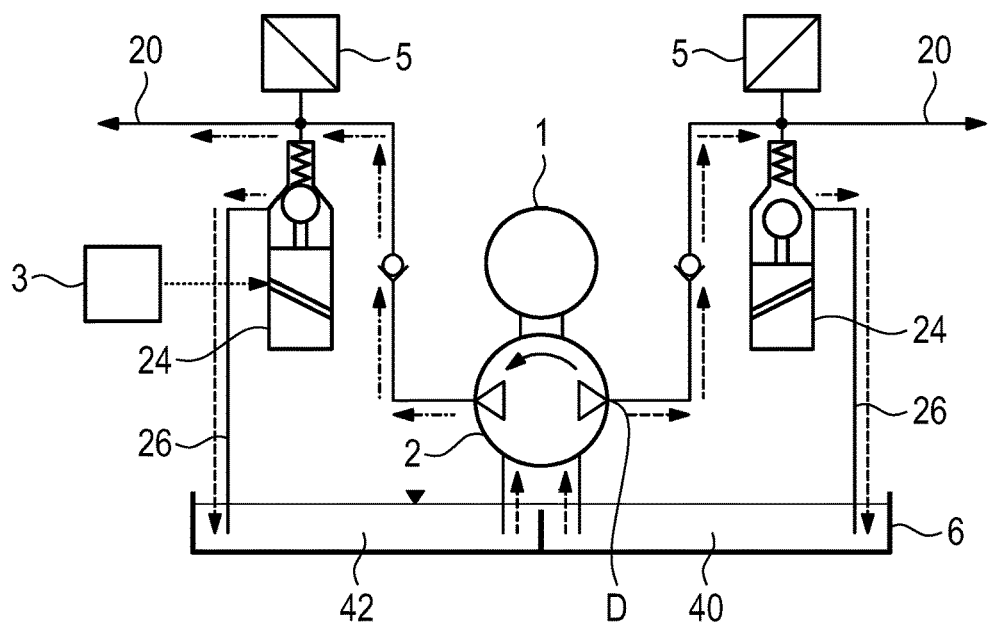
FIG. 7 shows the circuit diagram from FIG. 6, wherein the hydraulic flow is shown for two different operating states.

The right side of FIG. 7 shows the fluid flow in a state in which hydraulic pressure is not intended to be provided at the right pressure outlet 20.

All of the hydraulic fluid is pumped back from the pressure outlet D of the pump 2 in the solenoid valve 4 via the return line 26 into the storage container 6; the pump therefore operates in a circuit.

The left side of FIG. 7 shows the state in which a regulated hydraulic pressure is provided at the pressure outlet 20 of the pump unit. In this case, the solenoid valve 4 is activated by the electronic control system 3 in such a manner that the actual pressure corresponds to the desired pressure.

Figure 8:
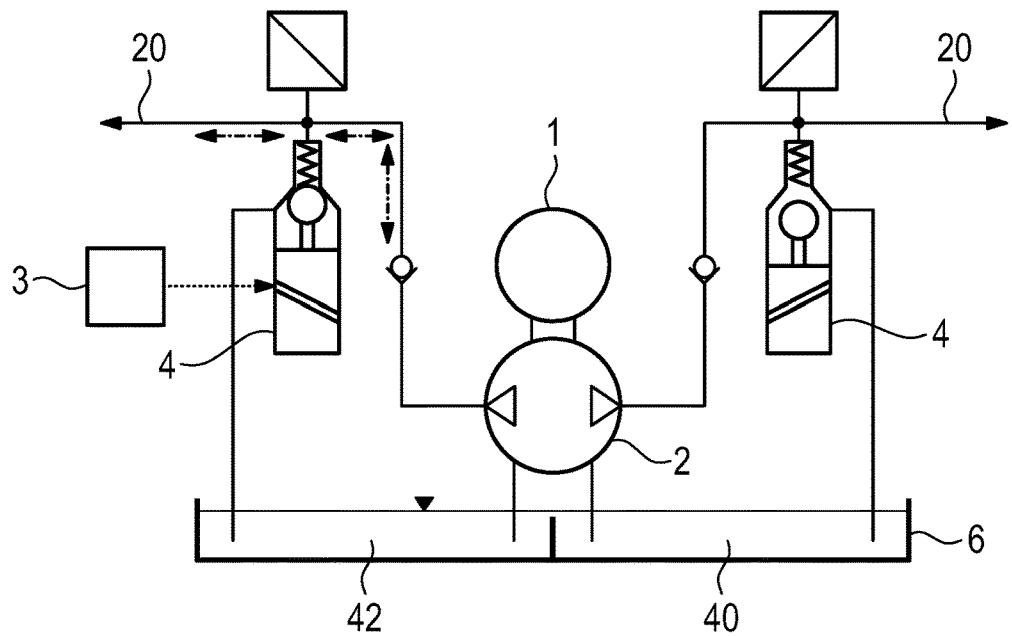
FIG. 8 shows the circuit diagram from FIG. 6, wherein a further operating state is shown.

FIG. 8 shows the pump unit in a state in which the pump 2 has been stopped. The solenoid valve 4 on the right side is open, and therefore the right pressure outlet 20 is free from pressure. By contrast, the left pressure outlet 20 is shut off since the solenoid valve 4 is completely closed. A hydraulic pressure built up downstream of the pressure outlet 20 will therefore be maintained even if the pump 2 is not operated further.

Figure 9:
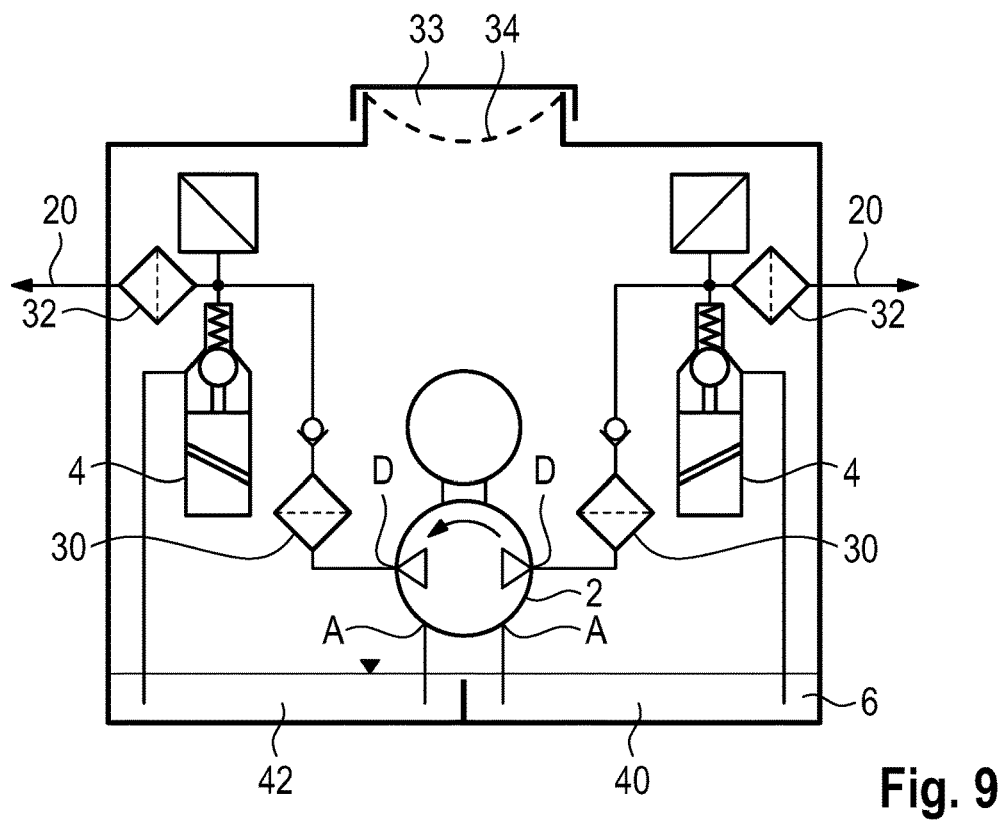
FIG. 9 shows the circuit diagram from FIG. 6, wherein the filters used in the pump unit are added.

The filters which are used within the pump unit will now be explained with reference to FIG. 9.

An essential feature of the concept for keeping impurities away from the pump unit is that no suction-side filters are used; all of the filters are arranged on the pressure side. Accordingly, the pump sucks up directly from the storage container 6.

A first filter 30 is located downstream of the corresponding pressure outlet of the pump 2. Said filter serves to filter out impurities from the hydraulic fluid before said impurities pass to the solenoid valve 4. Since a large portion of the hydraulic fluid is conducted by the pump 2 to the solenoid valve 4 and from there via the return line 26 to the storage container 6, the two filters 30 ensure that impurities are continuously filtered out from the hydraulic fluid because of the inner circulation of the hydraulic fluid.

A second filter 32 is provided downstream of the solenoid valve 4, but still upstream of the pressure outlet 20. Said filter prevents impurities from being able to be introduced into the pump unit. Said impurities are in particular original soilings of the lines and of the actuator and abrasion from the actuator, to which the hydraulic fluid is provided by the pump unit.

The filters 30, 32 are configured to be effective throughout the entire service life of the pump unit without having to be cleaned or replaced.

In the exemplary embodiment described, they have a cross section of the order of magnitude of 65 mm$^2$. Their mesh width is of the order of magnitude of 0.1 mm.

The storage container 6 is provided with a filling filter 34 which is arranged in such a manner that any hydraulic fluid which is filled into the storage container 6 via a filling opening 33 has to flow through the filling filter 34.

In the described exemplary embodiment, the filling filter 34 has a mesh width of the order of magnitude of 0.3 mm, wherein the material of which said filling filter is composed has a diameter of the order of magnitude of 0.2 mm. The filling filter 34 ensures that no impurities are introduced into the storage container 6 from the outside.

The storage container 6 is divided into two chambers 40, 42, wherein an intake opening 44 leading to the suction connection A of the pump 2 is arranged in each chamber 40, 42. By dividing the internal volume of the storage container 6 into two separate chambers 40, 42, it is ensured that whenever one of the hydraulic circuits has a leakage, a certain residual volume is still available in the other hydraulic circuit, with which the nondefective hydraulic circuit can continue to be operated for a certain time.

Thus, for example, a driver, after receiving a warning about the failure of the first hydraulic circuit, can still safely drive the vehicle into a parking bay or into a parking space since, for example in the case of a dual clutch gearbox, a clutch and the gearbox switching stages associated therewith are still ready for operation.

Figure 10:
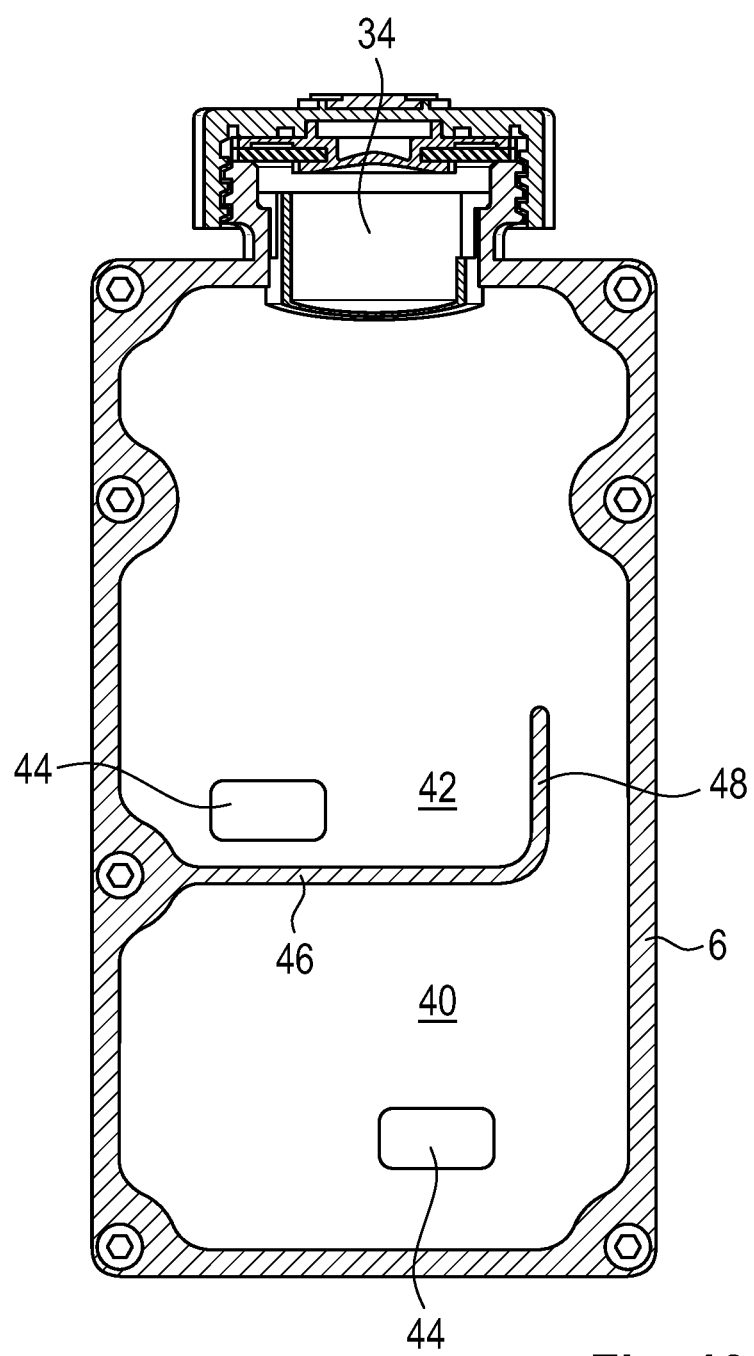
FIG. 10 shows a side view of a storage container which is used in the pump unit.
Figure 11:
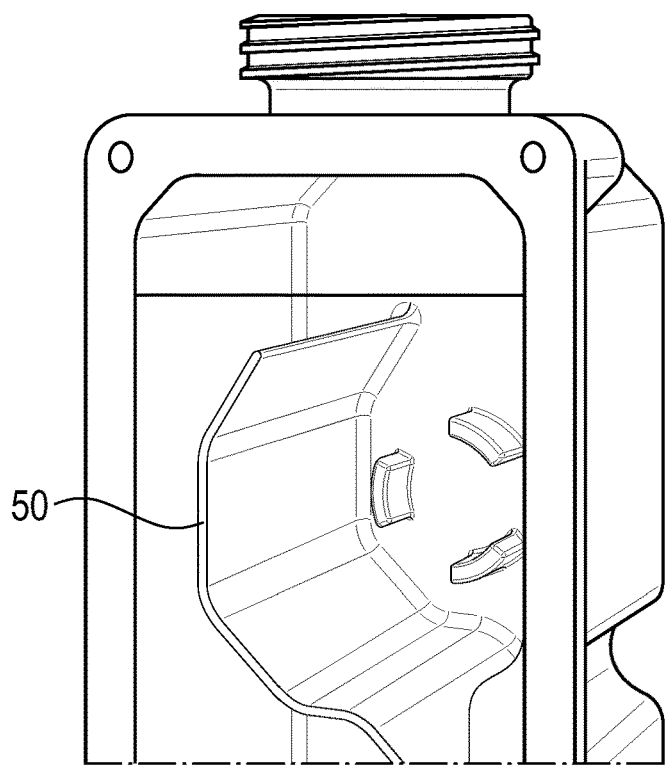
FIG. 11 shows a partial view of an alternative configuration of the storage container.
Figure 12:
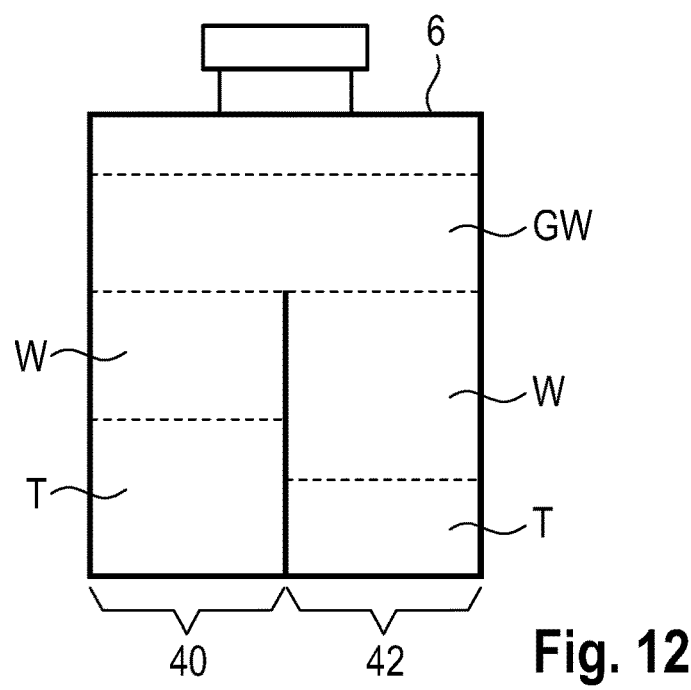
FIG. 12 shows a schematic illustration of the various volumes within the storage container.

In order to divide the storage container 6 into the two chambers 40, 42, use can be made of a substantially horizontally extending partition 46 which has a vertically extending end wall 48 (see FIG. 10), or a substantially vertically extending partition 50 (see FIG. 11).

Each chamber 40, 42 has a dead volume T which corresponds to the volume below the corresponding intake opening 44. A working volume W is located above the dead volume. Said working volume W is determined by the uppermost edge of the end wall 48 or of the partition 50. A common working volume GW is located above the working volumes W.

The hydraulic circuits are separated from one another whenever the common working volume GW drops to zero and each hydraulic circuit only still sucks up from its own working volume W.

Figure 2:
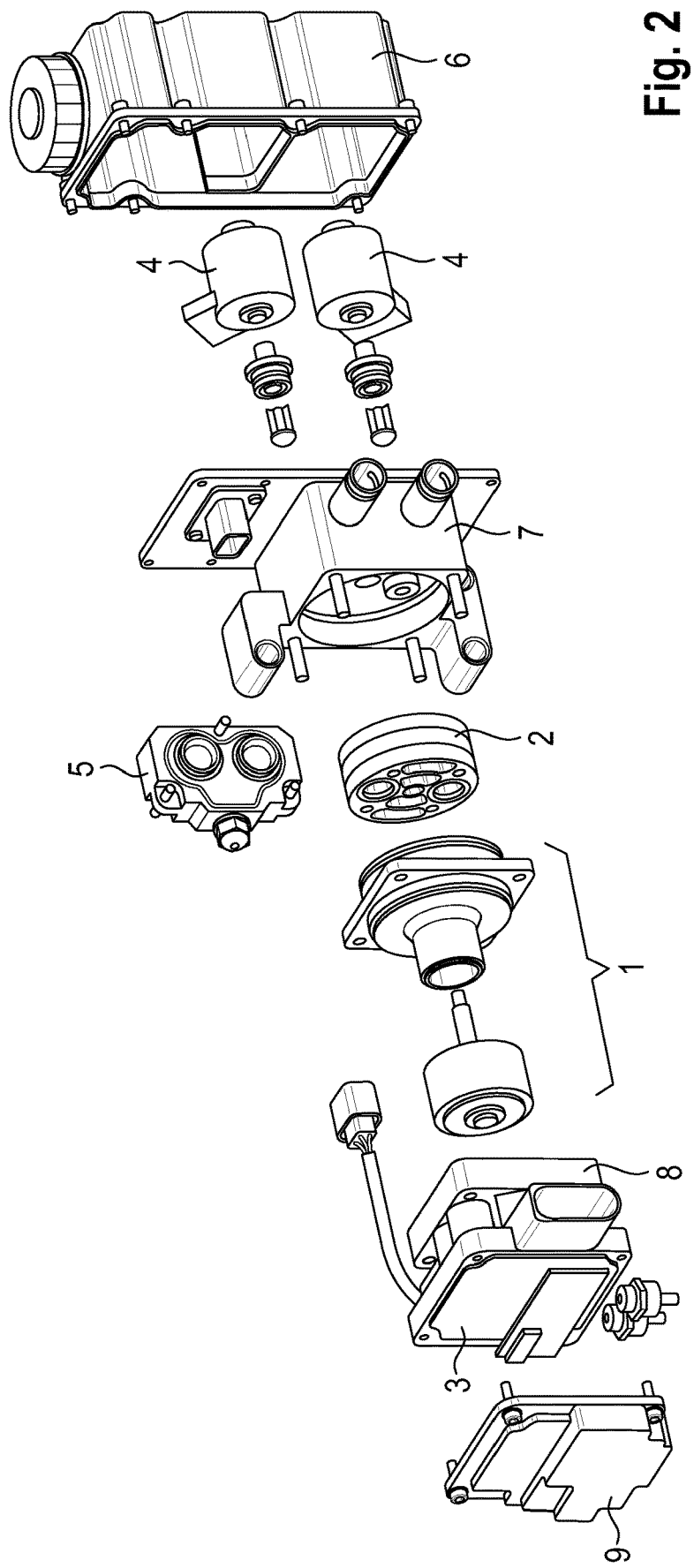
FIG. 2 shows the pump unit from FIG. 1 in a perspective exploded view.
Figure 3:
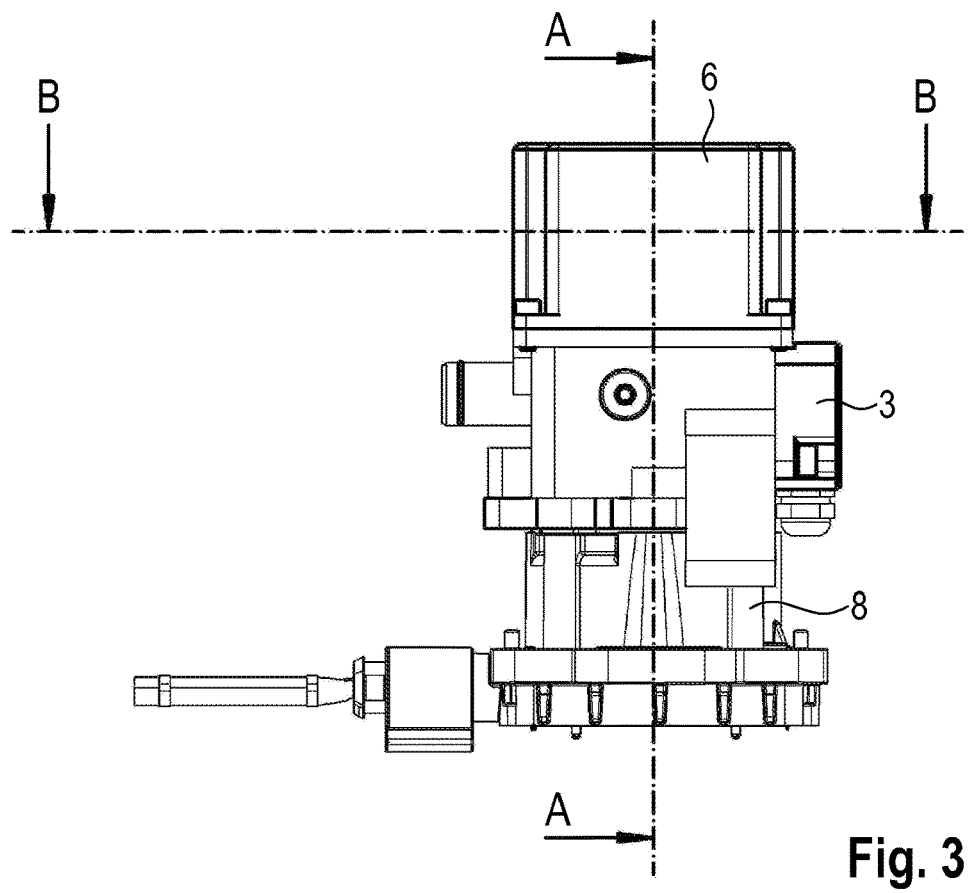
FIG. 3 shows the pump unit from FIG. 1 in a side view.

As is known from FIGS. 2, 4 and 5, the solenoid valves 4 are arranged within the storage container 6. A solenoid valve is in each case arranged here in a chamber 40, 42.

Figure 13:
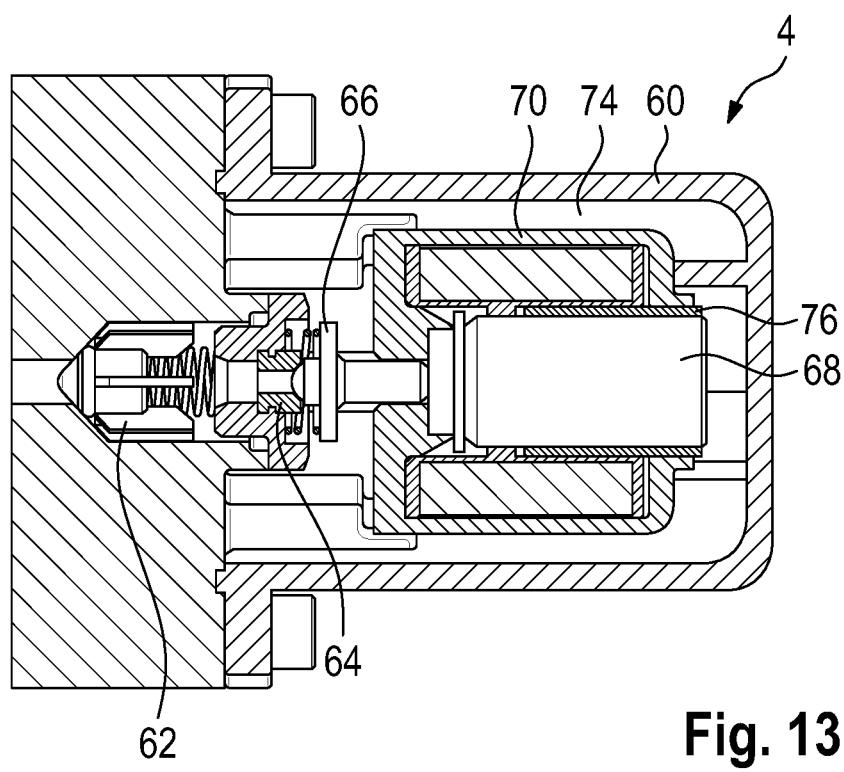
FIG. 13 shows a sectional view of a solenoid valve used in the pump unit.

Each of the solenoid valves 4 has a housing 60 (see FIG. 13) which surrounds the components of the solenoid valve 4.

Figure 14:
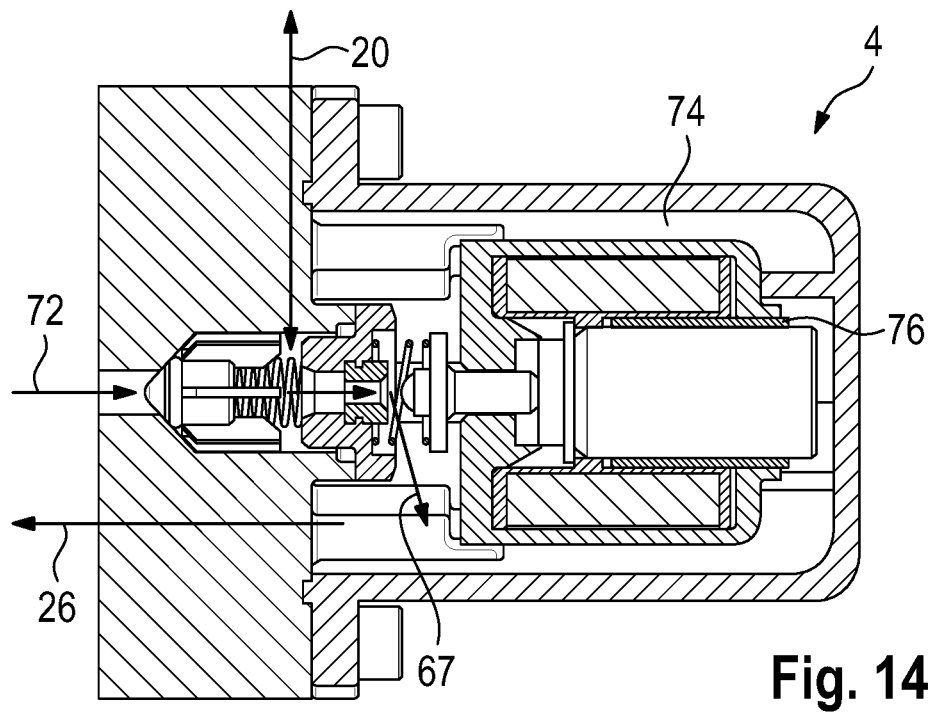
Figure 15:
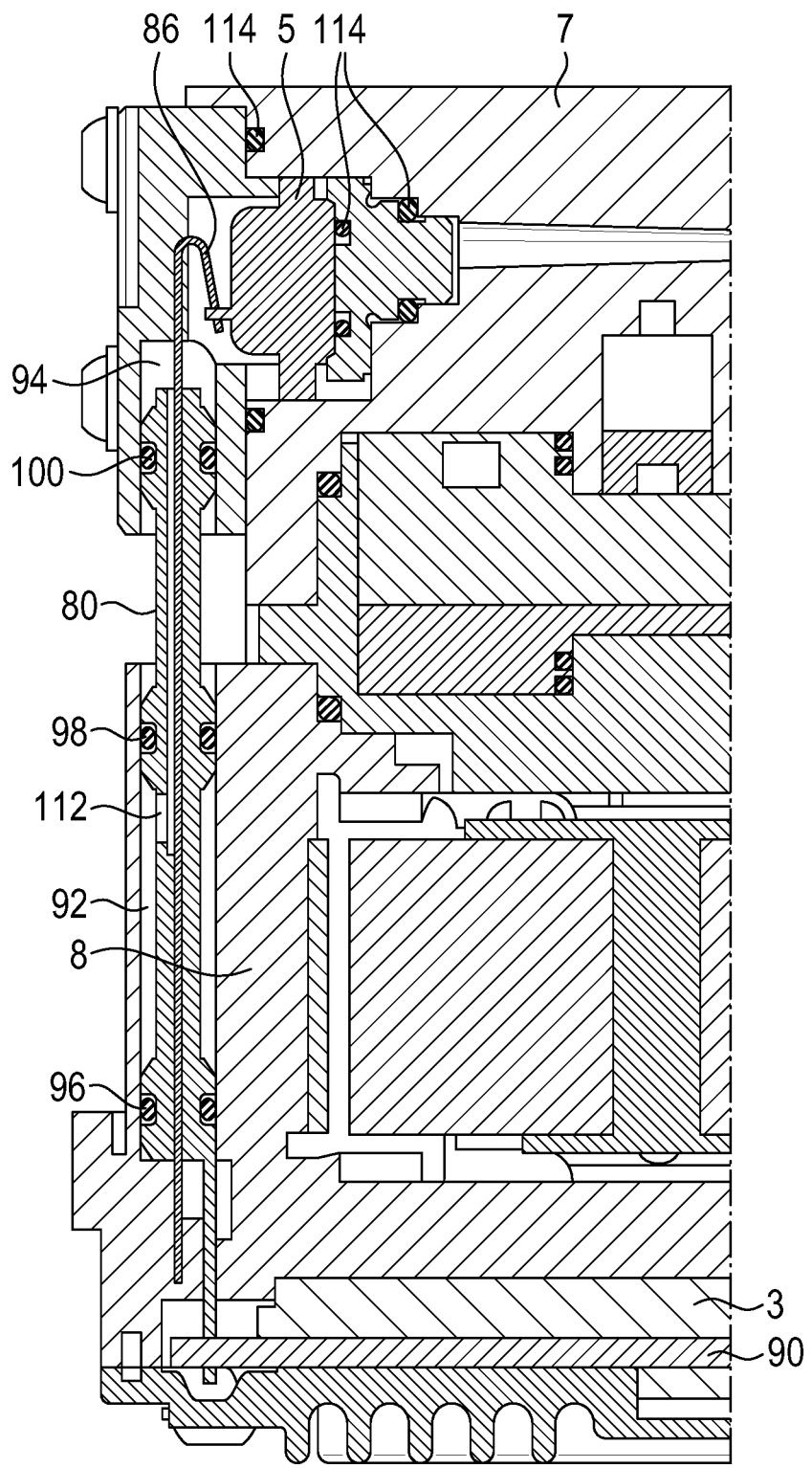
FIG. 15 shows a sectional view through the pump unit, wherein a conductor element is shown which is used for transmitting signals between pressure sensors and a printed circuit board.
Figure 16:
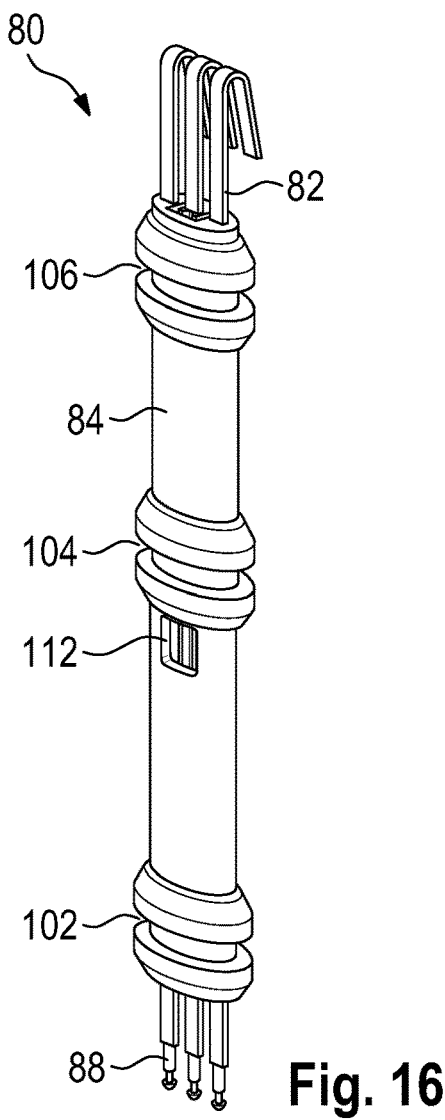
FIG. 16 shows the conductor element from FIG. 15 in a perspective view.
Figure 17:
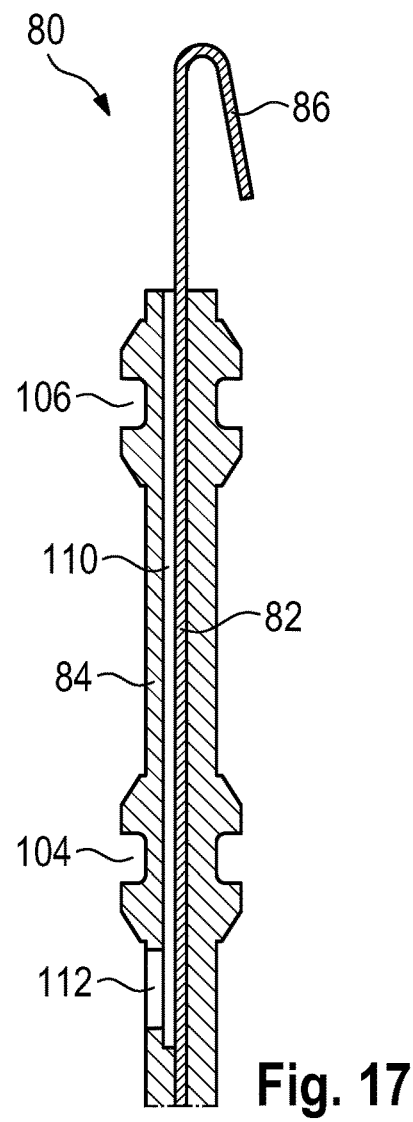
FIG. 17 shows the conductor element from FIG. 16 in a longitudinal section.
Figure 18:
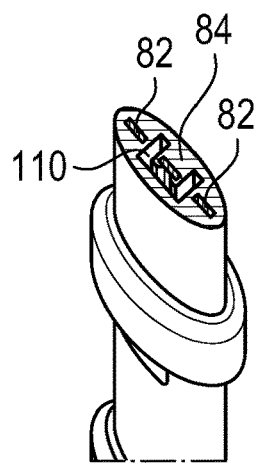
FIG. 18 shows the conductor element from FIG. 16 in a cross section.

The solenoid valve 4 has a nonreturn valve 62, a valve seat 64, a valve element 66, an armature 68 and a coil 70. The hydraulic fluid flows via an intake 72 (see FIG. 14) either to the pressure outlet 20 of the pump unit or via the opening cross section between the valve seat 64 and the valve element 66 to the return line 26.

A particular feature consists in that the route to the return line 26 leads through the interior of the housing 60. A corresponding return output 67 of the solenoid valve is symbolized in FIG. 14 by the vertically downwardly pointing arrow, the return output beginning behind the valve seat and leading into the space within the housing 60.

By means of this arrangement of the return output of the solenoid valve 4, an encircling, in particular annular, free space 74 which is present between the housing 60 and the coil 70 is flushed through with hydraulic fluid.

The nonreturn valve 62 which is integrated here in the solenoid valve 4 corresponds to the nonreturn valve 22 shown in FIGS. 6 to 9.

A further particular feature consists in that a bearing gap which is present between the armature 68 and a bearing 76 inserted into the coil 70 and the solenoid valve housing is likewise flushed through with hydraulic fluid.

A further particular feature of the solenoid valve 4 consists in that it is self-cleaning since the path to the return line 26 removes any particles from the open valve seat and the valve element.

It will now be explained with reference to FIGS. 15 to 20 how the pressure sensors 5 are connected to the electronic control system 3.

While, in the embodiment of FIGS. 1 and 2, a cable is still used for this purpose, in the case of the configuration according to FIGS. 15 to 20 two inherently stable conductor elements 80 are used. Each conductor element 80 contains three electric conductors which are composed, for example, of spring bronze. The conductors 82 are encased, in particular insert moulded, with plastic, such that the conductor element 80 is formed.

The conductors 82 are bent over by barely 180° on their side facing the pressure sensor 5 such that spring contacts 86 are formed. The latter serve to lie in a spring-elastic manner against corresponding connection contacts with the pressure sensors and thereby to produce an electrical contact (see FIG. 20).

The pressure sensor 5 is sealed on the side facing away from the conductor element 80 by means of various seals 114.

At the opposite end, the electric conductors 82 are designed as contact pins 88 which can be inserted into a plug on a printed circuit board 90 on which the electronic control system 3 is constructed.

The conductor element 80 extends from the printed circuit board 90 through a leadthrough 92 in the electronic housing 8 and into a receptacle 94 in the pump housing 7. The conductor element 80 is sealed both in relation to the leadthrough 92 and in relation to the receptacle 94. For this purpose, two seals 96, 98 are provided which provide a seal within the leadthrough 92, and a seal 100 is provided which provides a seal in relation to the receptacle 94.

The seals 96, 98, 100 are 0 rings which are accommodated in corresponding receiving grooves 102, 104, 106 which are provided on the conductor element 80.

Figure 19:
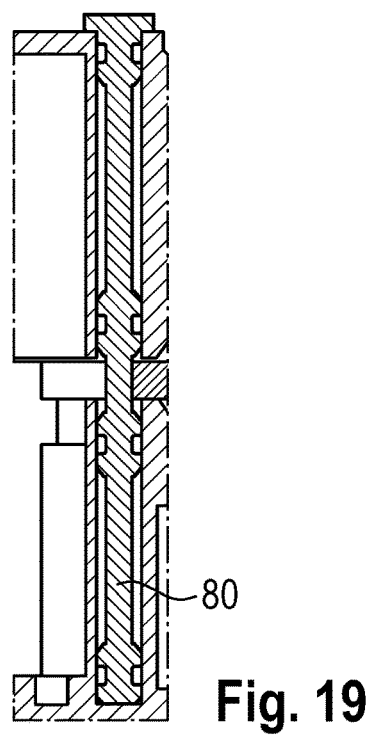
FIG. 19 shows a variant embodiment of the conductor element.
Figure 20:
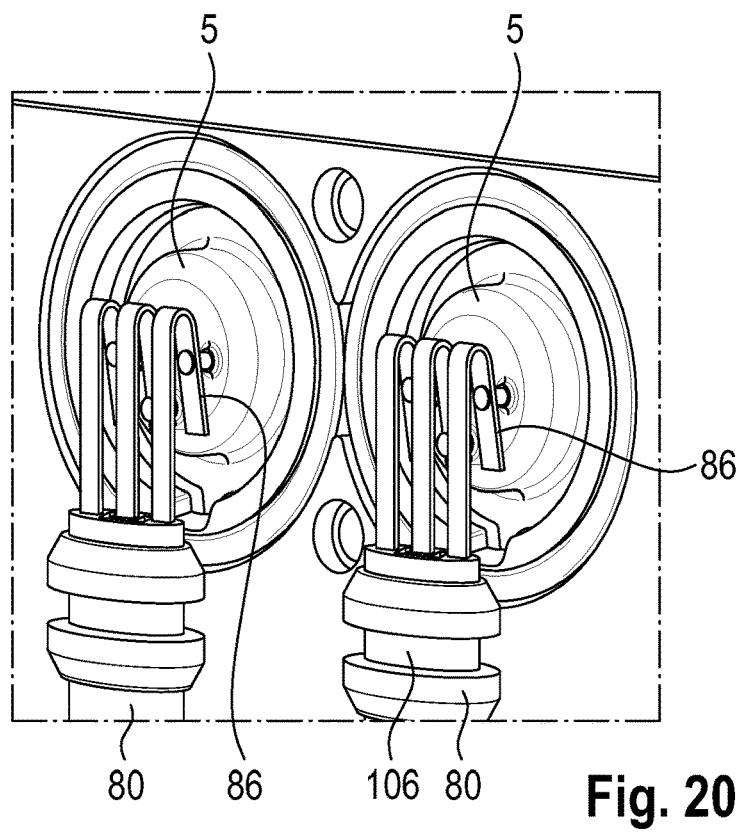
FIG. 20 shows a detail of the contact connection of the pressure sensor.

In the variant embodiment shown in FIG. 19, a total of four receptacles for seals are used.

The conductor element 80 is provided with a channel 110 which extends along the longitudinal direction of the conductor element 80, specifically leading from the side which is arranged in the receptacle 94, i.e. the side assigned to the pressure sensors 5, and into a recess 112 between the seals 96 and 98, i.e. within the leadthrough 92.

The channel 110 serves to check with little outlay whether the two conductor elements 80 are correctly mounted, in particular whether the seals 96, 98, 100 are providing a seal in the desired manner.

The test takes place by a negative pressure being applied in the region of the pressure sensors. After a short settling time, it can be measured whether the applied negative pressure remains constant or whether the pressure rises.

If the pressure remains constant, this means that all of the seals are providing a seal in the desired manner. If the negative pressure becomes lower, this means that at least one of the seals is not correctly providing a seal. This can either be the seal 96, and therefore air is sucked out of the region of the printed circuit board 90 into the leadthrough 92 and via the recess 112 into the channel 110. It can also mean that the seal 98 is not providing a seal, and therefore ambient air is sucked out of the region between the leadthrough 92 and the receptacle 94 towards the recess 112. Finally, it can mean that the seal 100 is not providing a seal, and therefore ambient air is sucked through the receptacle 94 towards the region of the pressure sensors 5.

The invention claimed is:

1. A pump unit for providing a hydraulic pressure for actuating an actuator in a drive train of a motor vehicle, comprising:
    an electric pump having an electric motor;
    a pump housing;
    a storage container for hydraulic fluid mounted on the pump housing; and
    at least one solenoid valve,
    wherein the solenoid valve is arranged within the storage container such that the solenoid valve is surrounded by hydraulic fluid,
    wherein the solenoid valve is attached directly on the pump housing of the pump, and
    wherein on a side opposite the storage container, an electronic housing is mounted on the pump housing, said electronic housing accommodating an electronic control system and containing a stator of the electric motor.

2. The pump unit according to claim 1, wherein the solenoid valve has a coil that is surrounded by a solenoid valve housing, and wherein a free space which is filled with hydraulic fluid is provided between the coil and the solenoid valve housing.

3. The pump unit according to claim 2, wherein the free space is annular.

4. The pump unit according to claim 2, wherein the solenoid valve has a return output which leads within the solenoid valve housing.

5. The pump unit according to claim 1, wherein the solenoid valve has an armature, wherein there is a bearing gap between the armature and a coil surrounding the armature, said bearing gap extending over at least 50% of the axial length of the armature, and wherein the bearing gap is filled with hydraulic fluid.

6. The pump unit according to claim 1, wherein the solenoid valve is a proportional valve.

7. The pump unit according to claim 1, wherein the actuator is a clutch actuator or gearbox actuator.

8. The pump unit according to claim 1, wherein the electric motor drives the electric pump.

9. The pump unit according to claim 1, wherein the solenoid valve is attached on an opposite side of the pump housing from the pump.

* * * * *